(12) United States Patent
Shinohara

(10) Patent No.: US 6,718,863 B2
(45) Date of Patent: Apr. 13, 2004

(54) VACUUM BOOSTER

(75) Inventor: Takayoshi Shinohara, Nagano (JP)

(73) Assignee: Nissin Kogyo Co., Ltd., Nagano-Ken (JP)

( * ) Notice: Subject to any disclaimer, the term of this patent is extended or adjusted under 35 U.S.C. 154(b) by 47 days.

(21) Appl. No.: 10/021,073

(22) Filed: Dec. 19, 2001

(65) Prior Publication Data

US 2002/0073834 A1 Jun. 20, 2002

(30) Foreign Application Priority Data

Dec. 20, 2000 (JP) .................................... P.2000-386933

(51) Int. Cl.[7] .................................................. F15B 9/10
(52) U.S. Cl. ...................................................... 91/376 R
(58) Field of Search ........................................ 91/376 R

(56) References Cited

U.S. PATENT DOCUMENTS

| 4,800,799 A | 1/1989 | Nishii |
| 5,711,203 A | 1/1998 | Gautier et al. |

FOREIGN PATENT DOCUMENTS

| DE | 197 56 225 A1 | 6/1998 | |
| GB | 2320539 A | * | 6/1998 |
| JP | 58-48923 | | 11/1983 |
| JP | 8-500307 | | 1/1996 |

OTHER PUBLICATIONS

European search report dated Dec. 19, 2002.

* cited by examiner

*Primary Examiner*—Edward K. Look
*Assistant Examiner*—Michael Leslie
(74) *Attorney, Agent, or Firm*—McGuire Woods LLP

(57) ABSTRACT

In a control valve of the vacuum booster, a valve portion is fitted with a valve cylinder to be slidably contacted with an inner wall of the valve cylinder, to form within said valve cylinder, a front annular chamber closed by a front face of the valve portion when the valve portion is seated on a vacuum introduction valve seat, and a read annular chamber, to which the rear of the valve portion is faced. The front annular chamber communicates with a first port, and the rear annular chamber communicates with a second port. An input rod is moved forward to separate the valve portion from an atmosphere introduction valve seat and to seat it on the vacuum introduction valve seat. Then, the valve portion is urged in accordance with the set load of a valve spring and the pressure difference between the front and rear annular chambers.

21 Claims, 6 Drawing Sheets

PRIOR ART

VACUUM BOOSTER

BACKGROUND OF THE INVENTION

1. Field of the Invention

The present invention relates to a vacuum booster used for the servo operation of a brake master cylinder for a vehicle. In particular, the present invention pertains to an improved vacuum booster, wherein a booster piston is located in a booster shell to divide the interior of the booster shell into a front vacuum chamber communicating with a vacuum source and a rear operating chamber, wherein a valve piston fitted into a valve cylinder so as to be slidable forward and backward, an input rod that connects the front end thereof to the valve piston, a control valve that, in accordance with the forward and backward movement of the input rod between the valve piston and the valve cylinder, alters the communication of the operating chamber with either the vacuum chamber or the atmosphere, and an input return spring that impels the input rod backward are arranged in the valve cylinder that communicates with the booster piston, wherein the control valve is constituted by a ring-shaped vacuum introduction valve seat formed in the valve cylinder, an atmosphere introduction valve seat formed in the valve piston and positioned inside the vacuum introduction valve seat, a valve element that includes: a ring-shaped attachment bead portion securely supported at the inner wall of the valve cylinder; an elastic cylinder axially extending from the attachment bead portion; and a valve portion connected, flange-like, to the front end of the elastic cylinder and located facing the vacuum introduction valve seat and the atmosphere introduction valve seat, on which the valve portion is to be seated, and wherein a first port that communicates with the vacuum chamber is opened to the outer wall side of the vacuum introduction valve seat, and a second port that communicates with the operating chamber is opened between the vacuum introduction valve seat and the atmosphere introduction valve seat, thus enabling the inside of the valve portion to communicate with the atmosphere.

2. Description of the Related Art

Vacuum boosters are well known, as is disclosed, for example, in JP-B-58-48923U.

The periphery of the control valve of the vacuum booster disclosed in the referenced publication is shown in FIG. 6. As is apparent from FIG. 6, a control valve 38 of a conventional vacuum booster includes: a ring-shaped vacuum introduction valve seat 30, which is formed in a valve cylinder 10; an atmosphere introduction valve seat 31, which is formed on a valve piston 18 that is connected to an input rod 20 and is located inside the vacuum introduction valve seat 30; a valve element 34, which includes a ring-shaped attachment bead portion 34b that is securely supported by the inner wall of the valve cylinder 10, an elastic cylinder 34c that extends forward from the attachment bead portion 34b, and a ring-shaped valve disk 34a that is connected, flange-like, to the front end of the cylinder 34c and is positioned opposite the vacuum introduction valve seat 30 and the atmosphere introduction valve seat 31 on which it is seated; and a valve spring 36, which impels the valve disk 34a in the direction in which it is seated on the vacuum introduction valve seat 30 and the atmosphere introduction valve seat 31. A first port 28, which communicates with the vacuum chamber 2, opens to the outer wall-side of the vacuum introduction valve 30, and a second port 29, which communicates with the operating chamber 3, is opened between the vacuum introduction valve seat 30 and the atmosphere introduction valve seat 31. An atmosphere introduction port 39, which communicates with the inner wall of the valve disk 34a, is formed at the rear of the valve cylinder 10. In addition, an input return spring 41, which impels the input rod 20 to the rear, is retracted between the valve cylinder 10 and the input rod 20, while a booster piston 4 is integrally coupled with the valve cylinder 10.

Generally, for this vacuum booster, since the initial operating force exerted by the input rod 20 is determined in accordance with the set load of the input return spring 41, it is preferable that the set load of the input return spring 41 be as small as possible in order to reduce the required operating force.

Assume that the atmosphere introduction valve seat 31 is released from the valve portion 34a of the valve element 34 by moving the input rod 20 forward against the set load of the input return spring 41, that the valve portion 34a is seated on the vacuum introduction valve seat 30, and that a forward propulsive force produced by a pressure difference between the vacuum chamber 2 and the operating chamber 3 is exerted on the booster piston 4. Since in this state, atmospheric pressure acts on the front face of the valve portion 34a and a vacuum pressure, produced by the vacuum chamber 2, acts on the rear face, it is necessary for the set load of the valve spring to be satisfactorily large in order to prevent the propulsive force produced by the pressure difference from releasing the valve portion 34a from the vacuum introduction valve seat 30. However, when the set load of the valve spring 36 is large, accordingly, the set load of the input return spring 41 must also be large. Otherwise, when the operating force applied to the input rod 20 is released, the set load of the valve spring 36 will prevent the valve portion 34a from separating from the vacuum introduction valve seat 30. This factor prevents any reduction in the set load of the input return spring 41 of the conventional vacuum booster.

SUMMARY OF THE INVENTION

To resolve this problem, it is one objective of the present invention to provide a vacuum booster wherein a smaller set load is provided for a valve spring, and accordingly, the set load of an input return spring can be reduced, as can the initial operating force applied to the input rod 20.

To achieve the above objective, according to a first aspect of the invention, there is provided a vacuum booster, comprising:

a booster shell;

a booster piston accommodated in the booster shell to divide the interior of the booster shell into a front vacuum chamber communicating with a vacuum source and a rear operating chamber;

a valve cylinder connected to the booster piston;

a valve piston fitted into the valve cylinder so as to be slidable forward and backward;

an input rod connected to the valve piston at a front end thereof;

an input return spring urging the input rod backward; and a control valve arranged within the valve cylinder, for changing over the communication of the operating chamber with one of the vacuum chamber and the atmosphere in accordance with the forward and backward movement of the input rod, the control valve including:

a ring-shaped vacuum introduction valve seat formed in the valve cylinder;

an atmosphere introduction valve seat formed in the valve piston and disposed inside the vacuum introduction valve seat;

a valve element having: a ring-shaped attachment bead portion securely held with respect to an inner wall of the valve cylinder; an elastic cylinder axially extending from the attachment bead portion; and, an annular valve portion connected in a flange shape to a front end of the elastic cylinder and facing the vacuum introduction valve seat and the atmosphere introduction valve seat, on which the valve portion is to be seated; and a valve spring urging the valve portion in a direction that the valve portion is seated on the vacuum introduction valve seat and the atmosphere introduction valve seat, wherein a first port that communicates with the vacuum chamber is opened to an outer periphery side of the vacuum introduction valve seat, a second port that communicates with the operating chamber is opened between the vacuum introduction valve seat and the atmosphere introduction valve seat, and an inner periphery side of the valve portion is communicated with the atmosphere, further wherein the valve portion is fitted with the valve cylinder so as to be slidably contacted with the inner wall of the valve cylinder, to define a front annular chamber and a read ring chamber within the valve cylinder, the front rind chamber being closed by a front face of the valve portion when the valve portion is seated on the vacuum introduction valve seat, the rear annular chamber being formed so that the rear of the valve portion is faced thereto, and further wherein the front annular chamber communicates with the first port, and the rear annular chamber communicates with the second port.

According to the first aspect, when the input rod is moved forward against the set load of the input return spring, and when the atmosphere introduction valve seat is separated from the valve portion of the valve element while the valve disk is seated on the vacuum introduction valve seat, the vacuum pressure, which is transmitted from the first port to the front annular chamber of the valve cylinder, acts on the front face of the valve portion facing the front annular chamber, while the atmospheric pressure, which is transmitted from the second port to the rear annular chamber, acts on the rear face of the valve seat facing the rear annular chamber. Thus, not only in accordance with the set load of the valve spring, but also in accordance with the pressure difference between the front and rear annular chambers, the valve portion is urged in the direction in which it will be seated on the vacuum introduction valve seat. Therefore, the set load of the valve spring can be reduced by a value equivalent to the urging force produced by the pressure difference. And accordingly, only a small set load is required for the input return spring that impels the input rod to the rear, so that the load imposed by the initial operation of the input rod can be reduced.

According to a second aspect, in addition to the first aspect, the valve portion includes a sealing lip in the outer periphery thereof, bent rearwardly so as to be slidably contacted with the inner wall of the valve cylinder.

According to the second aspect, when the atmosphere introduction valve seat is separated from the valve portion of the valve element, and when the valve portion is seated on the vacuum introduction valve seat, the force with which the sealing lip is held closely against the inner wall of the valve cylinder is increased due to the pressure difference generated between the front and rear annular chambers, and between the front and rear annular chambers an airtight condition can be obtained.

In addition to the first and second aspect, according to a third aspect, a through hole communicating with the rear annular chamber and the first port is formed in the valve cylinder parallel to an axial line of the valve cylinder.

According to the third aspect, at the same time as the valve cylinder is formed, the through hole can also be formed by a core cylindrical pin. Thus, a valve cylinder having a communication path can be provided at a low cost.

DETAILED DESCRIPTION OF THE PREFERRED EMBODIMENTS

One embodiment of the present invention will now be described while referring to FIGS. 1–5.

Figure 1:
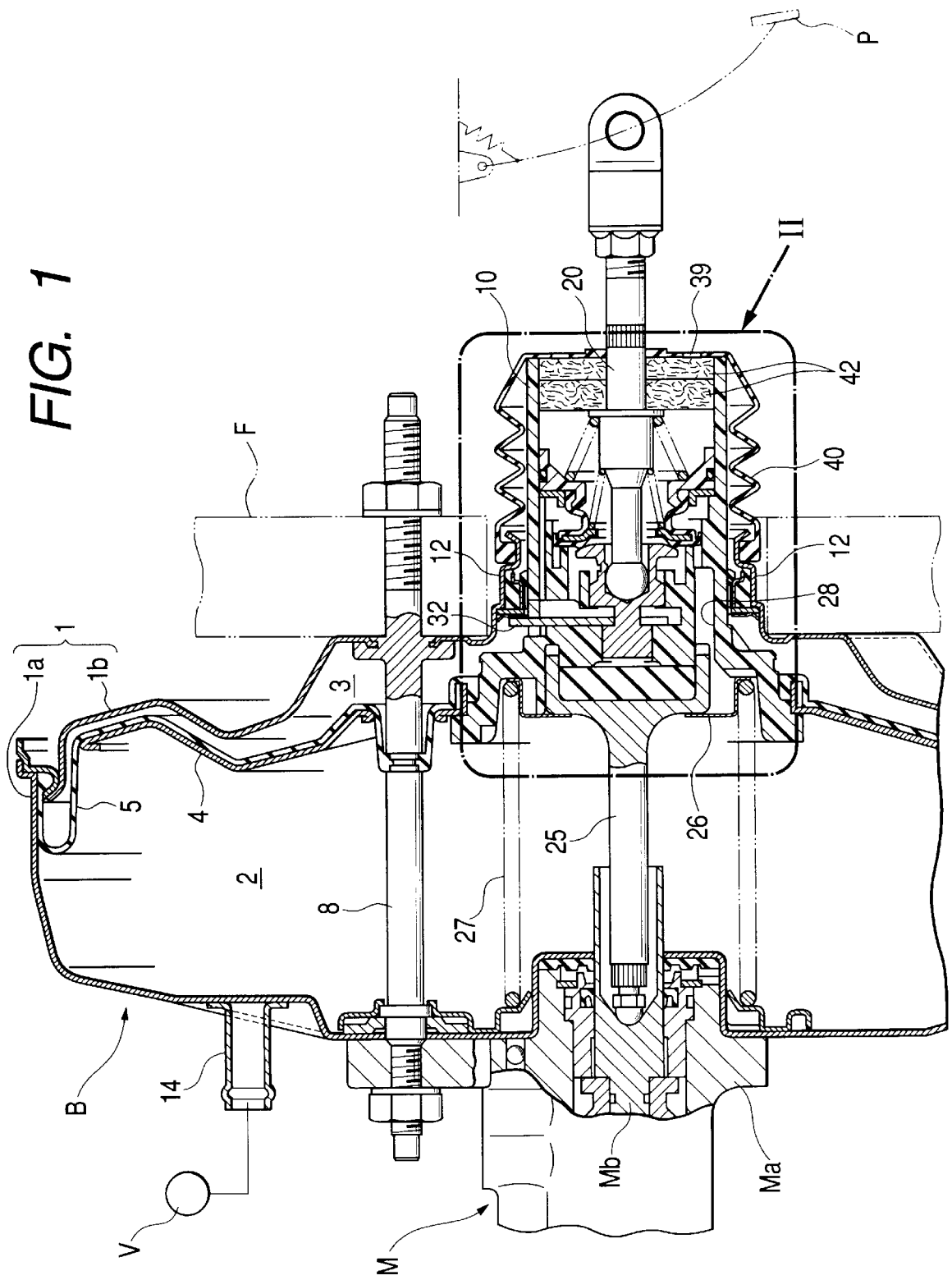
FIG. 1 is a vertical cross-sectional view of a single type vacuum booster according to the invention wherein an input rod is halted.
Figure 2:
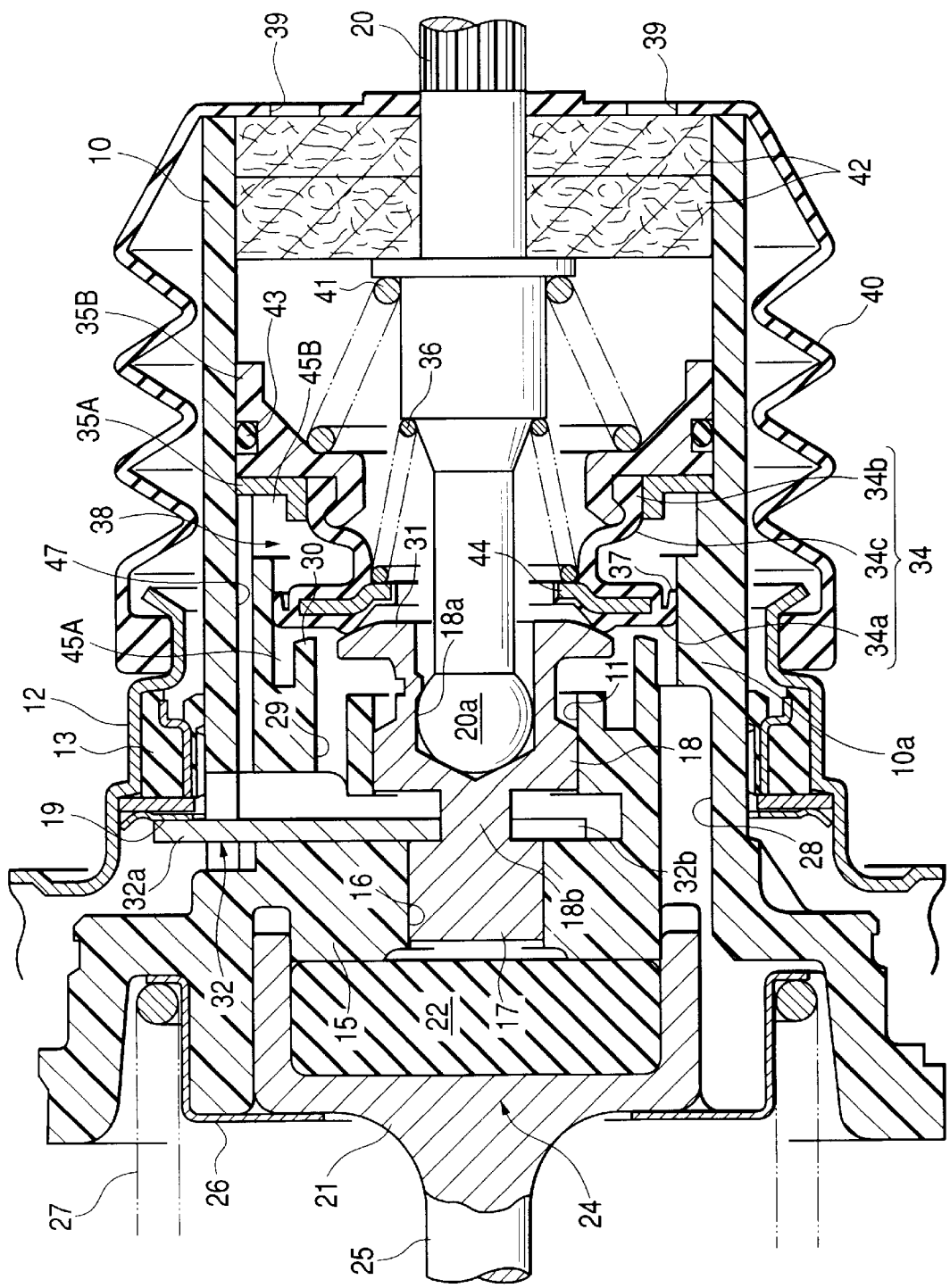
FIG. 2 is an enlarged diagram showing a portion II in FIG. 1.

First, in FIGS. 1 and 2, a booster shell 1 of a vacuum booster B is formed of a pair of a front half shell 1a and a rear half shell 1b, the facing ends of which are connected with each other. The half shells 1a and 1b are coupled together by a plurality of penetrating tie rods 8 (in FIG. 1, only one tie rod is shown). The rear half shell 1b is secured, via the tie rods 8, to the front wall F of the vehicle compartment, and a cylinder body Ma of a brake master cylinder M is secured to the front half shell 1a.

The inside of the booster shell 1 is divided into a front vacuum chamber 2 and a rear operating chamber 3 by a booster piston 4 which is reciprocally accommodated in the booster shell 1, and a diaphragm 5 which is bonded over the rear face of the booster piston 4 and sandwiched between the half shells 1a and 1b. The vacuum chamber 2 is connected, via a vacuum pipe 14, to a vacuum source V (e.g., the interior of the intake manifold of a combustion engine).

The booster piston 4 and the diaphragm5 are also penetrated by the tie rods 8, and the diaphragm 5, especially, is fitted over the tie rods 8 so that the airtight condition existing between the vacuum chamber 2 and the operating chamber 3 can be maintained, while the movement of the booster piston 4 is permitted.

The booster piston 4, which is formed of stainless steel, is formed in a ring shape, and a cylinder valve 10 made of a synthetic resin, is integrally coupled with the centers of the booster piston 4 and the diaphragm 5. The valve cylinder 10 is slidably supported, via a bearing member 13 having a sealing lip, to a support cylinder 12 projecting rearwardly from the center of the rear half shell 1b.

Arranged within the valve cylinder 10 are a valve piston 18, an input rod 20 which is connected to the valve piston 18, and a control valve 38 which alters the communication 79 of the operating chamber 3 with either the vacuum chamber 2 or the atmosphere in accordance with the movement of the input rod 20.

The valve piston 18 is slidably fitted into a guide hole 11 formed in the valve cylinder 10, and a reaction piston 17 is formed at the front portion thereof, via a neck portion 18b, while a flange-shaped atmosphere introduction valve seat 31 is formed at the rear portion thereof. Further, in the cylinder valve 10, there is formed a ring-shaped vacuum introduction valve seat 30 positioned concentrically with the atmospheric introduction valve seat 31 to enclose the atmospheric introduction valve seat 31.

A connection hole 18a is formed in the valve piston 18 that opens to the rear of the atmospheric introduction valve seat 31, and a spherical front end 20a of the input rod 20 is fitted into the connection hole 18a. Part of the valve piston 18 is calked to prevent it from slipping off the front end 20a, and as a result, the input rod 20 is pivotally coupled with the valve piston 18.

In addition, one common valve element 34 is attached to the valve cylinder 10, for cooperating with the vacuum introduction valve seat 30 and the atmosphere introduction valve seat 31. The valve seat 34 is entirely formed of an elastic material, such as rubber, and includes a ring-shaped attachment bead portion 34b, an elastic cylinder 34c that extends forward from the attachment bead portion 34b, and a flange-shaped valve portion 34a that projects radially outward from the front end of the elastic cylinder 34c. A ring-shaped reinforcing plate 44 is inserted from the inner wall of the valve portion 34a by mold coupling. Further, a ring-shaped sealing lip 37, which is bent to the rear, is integrally formed with the outer wall of the valve portion 34a.

The attachment bead portion 34b is sandwiched between a pair of valve holders 35A and 35B, which contact the rear end of a ring-shaped projection 10a. The ring-shaped projection 10a is integrally formed in the inner wall of the valve cylinder 10 together with the vacuum introduction valve seat 30. At this time, the rear valve holder 35B is fitted into the inner wall of the valve cylinder 10 via an O-ring 43. And, the valve portion 34a is located facing the atmosphere introduction valve seat 31 and the vacuum introduction valve seat 30, so that the valve portion 34a can be seated on them.

A valve spring 36 is shrinkingly disposed between the reinforcing plate 44 of the valve portion 34a and the input rod 20 and impels the valve portion 34a in the direction that the valve portion 34a seats on the valve seats 30 and 31. As a result, a control valve 38 is constituted by the vacuum introduction valve seat 30, the atmosphere introduction valve seat 31, the valve element 34 and the valve spring 36.

An input return spring 41 is shrinkingly disposed between the rear valve holder 35B and the input rod 20, and with this arrangement, the front and rear valve holders 35A and 35B are contacted and held with the rear end of the ring-shaped projection 10a of the valve cylinder 10, while the input rod 20 is urged to the rear.

A front annular chamber 45A that encloses the vacuum introduction valve seat 30 is formed in the ring-shaped projection 10a on the inner wall of the valve cylinder 10, and the front face of the valve portion 34a faces the ring chamber 45A. The inner wall of the front annular chamber 45A, which radially is near the exterior, extends to the rear from the vacuum introduction valve seat 30, and the sealing lip 37 on the outer wall of the valve portion 34a closely contacts with and slides along the inner wall of the ring chamber 45A.

Therefore, the front annular chamber 45A is closed when the valve portion 34a is seated on the vacuum introduction valve seat 30.

Furthermore, a rear annular chamber 45B to which the rear face of the valve portion 34a is faced, is defined inside the ring-shaped projection 10a by using the valve portion 34a with the sealing lip 37.

First and second ports 28 and 29 are formed in the valve cylinder 10. One end of the first port 28 opens into the vacuum chamber 2, and the other end thereof opens into the front annular chamber 45A. One end of the second port 29 opens into the operating chamber 3, and the other end thereof opens between the vacuum introduction valve seat 30 and the atmosphere introduction valve seat 31. The second port 29 communicates with the rear annular chamber 45B via a communication hole 47, which is formed at the base of the ring-shaped projection 10a and is parallel to the axial line of the valve cylinder 10. The communication hole 47, which is parallel to the axial line of the valve cylinder 10, can be easily formed by using a core cylindrical pin during the process employed for forming the valve cylinder 10.

The both ends of a boot 40, which covers the valve cylinder 10 and can be stretched or contracted, are fitted around the input rod 20 and to the rear end of a support cylinder 12 of the rear half shell 1b. An atmosphere inlet port 39 Communicating with the inside of the valve element 34 is formed in the rear surface of the boot 40. A filter 42, which filters the air that flows through the atmosphere inlet port 39, is located between the outer wall of the input rod 20 and the inner wall of the valve cylinder 10. The filter 42 has a flexibility so that the relative movements of the input rod 20 and the valve cylinder 10 are not interfered therewith.

A key 32 which determines the retraction limits for the booster piston 4 and the valve piston 18 is attached to the valve cylinder 10 so that the key 32 can be moved by a predetermined distance in the axial direction. At the internal end of the key 32, a fork 32b extends across the neck portion 18b located between the valve piston 18 and the reaction piston 17. An outer end 32a of the key 32 is located to face with the front face of a stopper wall 19 provided in the support cylinder 12 of the rear half shell 1b. Therefore, when the key32 contacts the stopper wall 19, the limit of the retraction of the booster piston 4 and the valve cylinder 10 is determined, and when the rear end of the reaction piston 17 contacts the key 32, the limit of the retraction of the valve piston 18 and the input rod 20 is determined. Since the width of the neck portion 18b in the axial direction is set to be greater than the thickness of the key 32, the valve piston 18 and the key 32 can be moved slightly relative to each other.

A forwardly projecting operating piston 15 and a small diameter cylinder hole 16 which passes through the center of the operating piston 15, are formed in the valve cylinder 10, and the reaction piston 17 is slidably fitted into the cylinder hole 16. A cup member 21 is slidably fitted over the outer wall of the operating piston 15, and a flat flexible piston 22 is inserted into the cup member 21 so that the flat flexible piston 22 is positioned opposite to the operating piston 15 and the reaction piston 17. At this time, a specific gap is formed between the reaction piston 17 and the flexible piston 22 when the vacuum booster B is not being operated.

An output rod 25 projects from the front face of the cup member 21, and is connected to a piston Mb of the brake master cylinder M.

With this arrangement, the operating piston 15, the reaction piston 17, the flexible piston 22 and the cup member 21 constitute a reaction mechanism 24 that feeds part of the output produced by the output rod 25 back to the input rod 20.

A retainer 26 is positioned so that it contacts the cup member 21 and the front face of the valve cylinder 10. A booster return spring 27, which urges the booster piston 4 and the valve cylinder 10 to the rear, is shrinkingly disposed between the retainer 26 and the front wall of the booster shell 1.

The operation performed for the embodiment will now be explained.

As is shown in FIGS. 1 and 2, in the state wherein the vacuum booster B is halted, the key 32 attached to the valve cylinder 10 contacts the front face of the stopper wall 19 of the rear half shell 1b, and the rear end face of the reaction piston 17 contacts the key 32, so that the booster piston 4 and the input rod 20 are located at the retraction limit position. At this time, the atmosphere introduction valve seat 31 presses against the valve portion 34a of the valve element 34, which it closely contacts, and slightly separates the valve portion 34a from the vacuum introduction valve seat 30. Thus, communication between the atmosphere inlet port 39 and the second port 29 is cut off, while communication between the first and the second ports 28 and 29 is established. Therefore, the vacuum pressure in the vacuum chamber 2 is transmitted via the first and second ports 28 and 29 to the operating chamber 3, and since this equalizes the pressure in the chambers 2 and 3, the booster piston 4 and the valve cylinder 10 are held at the retraction position by the urging force exerted by the booster return spring 27.

Figure 3:
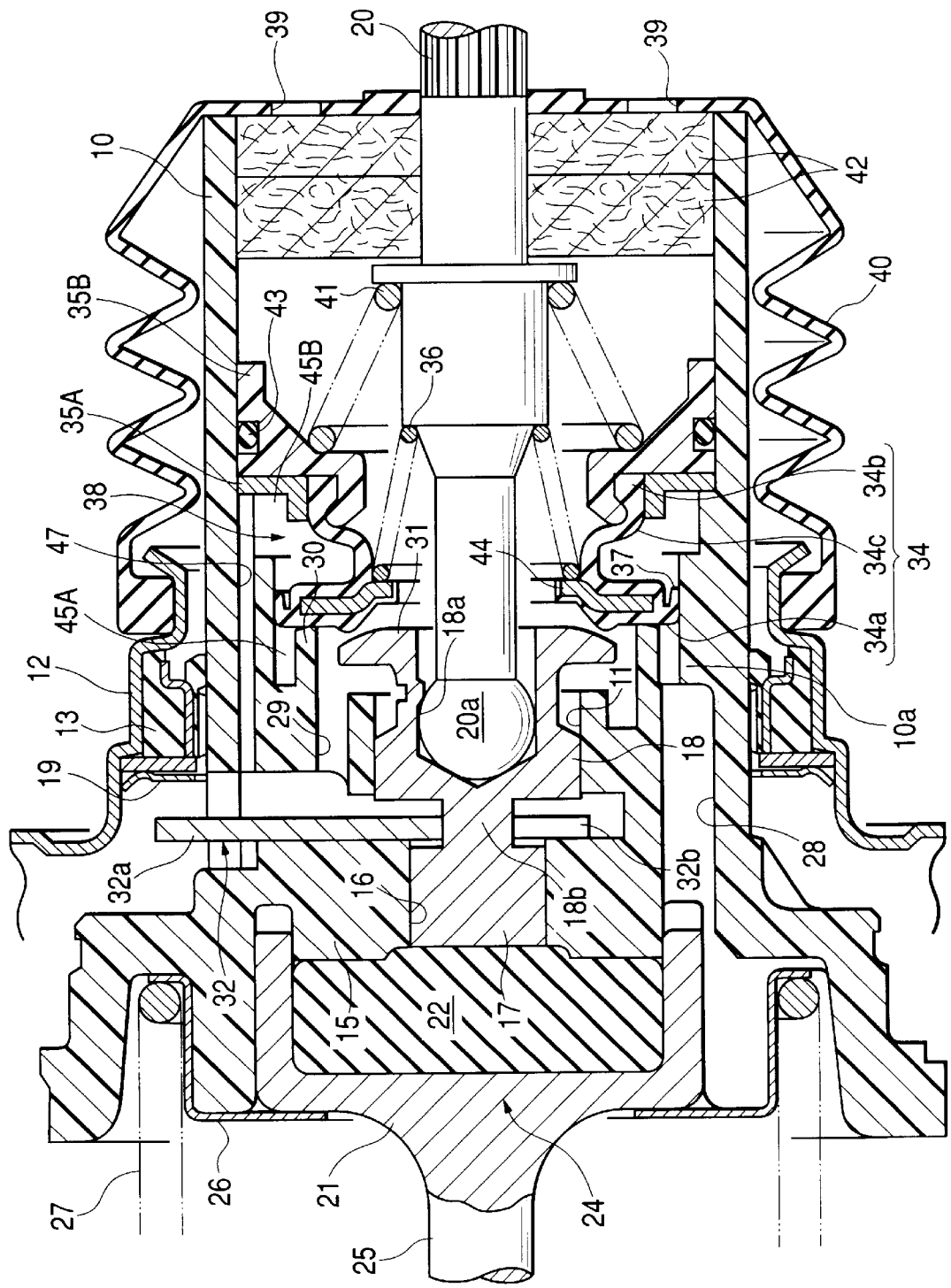
FIG. 3 is a diagram, corresponding to FIG. 2, used to explain the servo operating state.

When to brake a vehicle the brake pedal P is pushed in and the input rod 20, together with the valve piston 18, is driven forward against the set load of the input return spring 41, the elastic cylinder 34c is stretched by the force exerted by the valve spring 36, and the valve portion 34a is seated on the vacuum introduction valve seat 30, while at the same time, the atmosphere introduction valve seat 31 is separated from the valve element 34, as is shown in FIG. 3. Thus, communication between the first and the second ports 28 and 29 is cut off, and communication is established between the second port 29 and the atmosphere inlet port 39 via the interior of the valve element 34.

As a result, the air that flows into the valve cylinder 10 through the atmosphere inlet port 39 passes through the atmosphere introduction valve seat 31 and subsequently is transmitted, via the second port 29, to the operating chamber 3, wherein the pressure of the operating chamber 3 is increased until it is higher than that in the vacuum chamber 2. Thus, by employing the forward propulsive force produced by the pressure difference, the booster piston 4, together with the valve cylinder 10, the operating piston 15, the flexible piston 22, the cup member 21 and the output rod 25, is pressed forward against the force exerted by the booster return spring 27, and the piston Mb of the brake master cylinder M is driven forward by the output rod 25. The flexible piston 22 is compressed by the reaction force that is generated as the piston Mb is driven, while a part of the piston 22 is distended and enters the small cylinder hole 16. However, since the reaction force is not transmitted to the input rod 20 until the distended portion of the flexible piston 22 contacts the front face of the reaction piston 17, the output of the output rod 25 has a leaping characteristic, as indicated by line a-b in FIG. 5, and produces a precipitous rise.

During the forward movement of the input rod 20, the vacuum pressure, which is transmitted from the first port 28 to the front annular chamber 45A of the valve cylinder 10, acts on the front face of the valve portion 34a that faces the front annular chamber 45A, while the atmospheric pressure, which is transmitted from the second port 29, via the communication hole 47, to the rear annular chamber 45B, acts on the rear face of the valve portion 34a that faces the rear annular chamber 45b. Therefore, the valve portion 34a is urged in the direction in which it will be seated on the vacuum introduction valve seat 30, not only by the set load of the valve spring 36, but also by the difference in pressures built up in the front and rear annular chambers 45A and 45B. Therefore, the set load of the valve spring 36 can be reduced by a value equivalent to the urging force produced by the pressure difference, and accordingly, the set load of the input return spring 41, which urges the input rod 20 in the retraction direction, can also be reduced. As a result, the jumping characteristic can be produced by applying a smaller initial operating force, so that invalid strokes of the brake master cylinder M and the wheel brakes can be quickly removed, and the response of each wheel brake can be enhanced.

Further, in this state, since the sealing lip 37 on the outer wall of the valve portion 34a is bent to the rear and closely contacts the inner wall of the valve cylinder 10, the contact force applied to the inner wall can be increased by the pressure difference between the front and rear annular chambers 45A and 45B, and an airtight condition between the ring chambers 45A and 45B can be obtained.

After the flexible piston 22 contacts the reaction piston 17, a part of the reaction force exerted by the output rod 25 is fed back to the input rod 20, via the flexible piston 22, so that a driver can perceive the magnitude of the output of the output rod 25. The output of the output rod 25 is increased, as is indicated by line b-c in FIG. 5, at a servo ratio that is determined by the ratio of the pressure reception areas of the operating piston 15 and the reaction piston 17 that contact the flexible piston 22.

After the pressure difference between the vacuum chamber 2 and the operating chamber 3 has reached the servo limit point c, as is indicated by line c-d, the output of the output rod 25 equals the sum of the maximum propulsive force produced, due to the pressure difference, by the booster piston 4 and the operating pressure input to the input rod 20.

Figure 4:
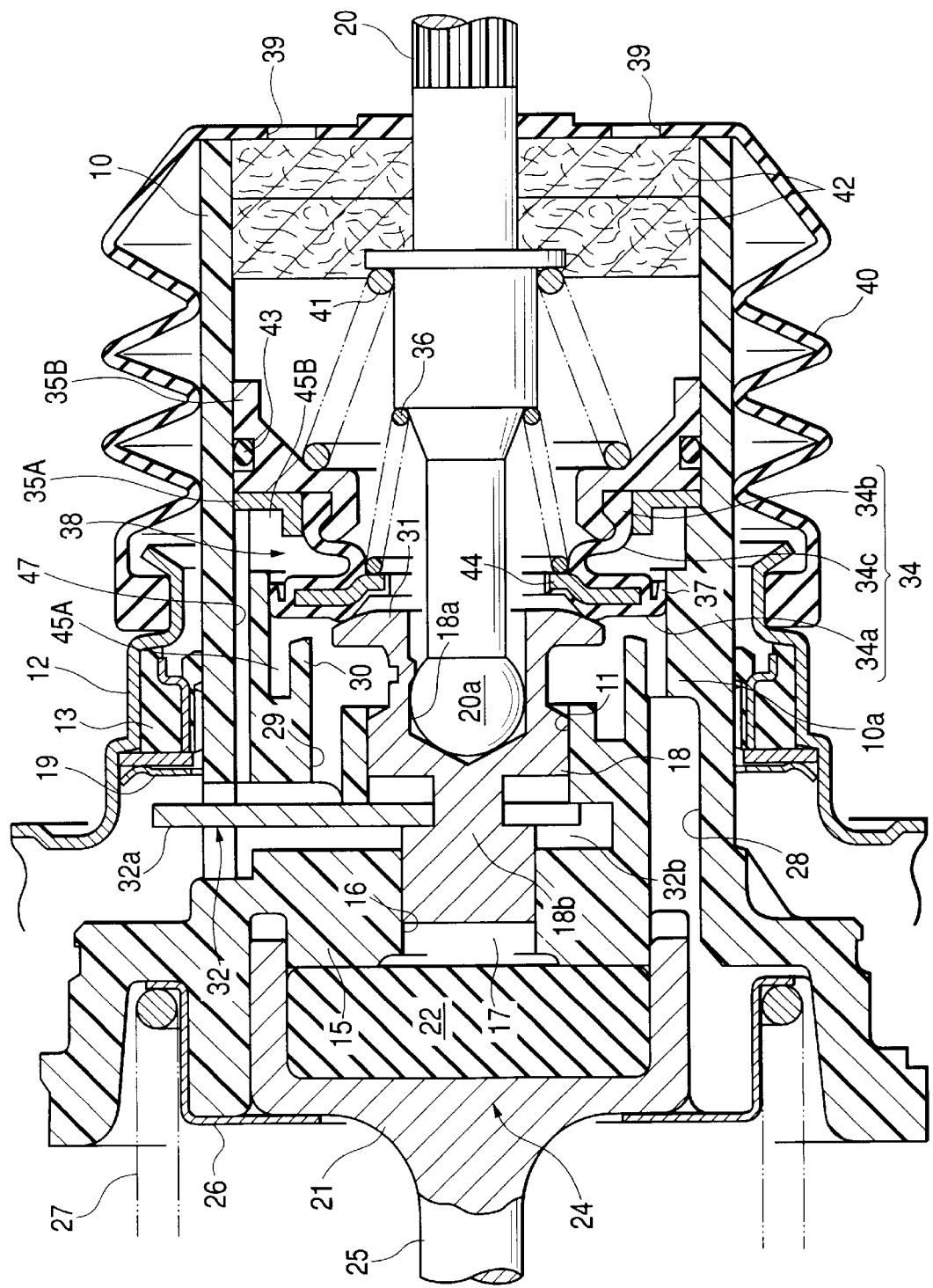
FIG. 4 is a diagram, corresponding to FIG. 2, used to explain the servo release process.
Figure 5:
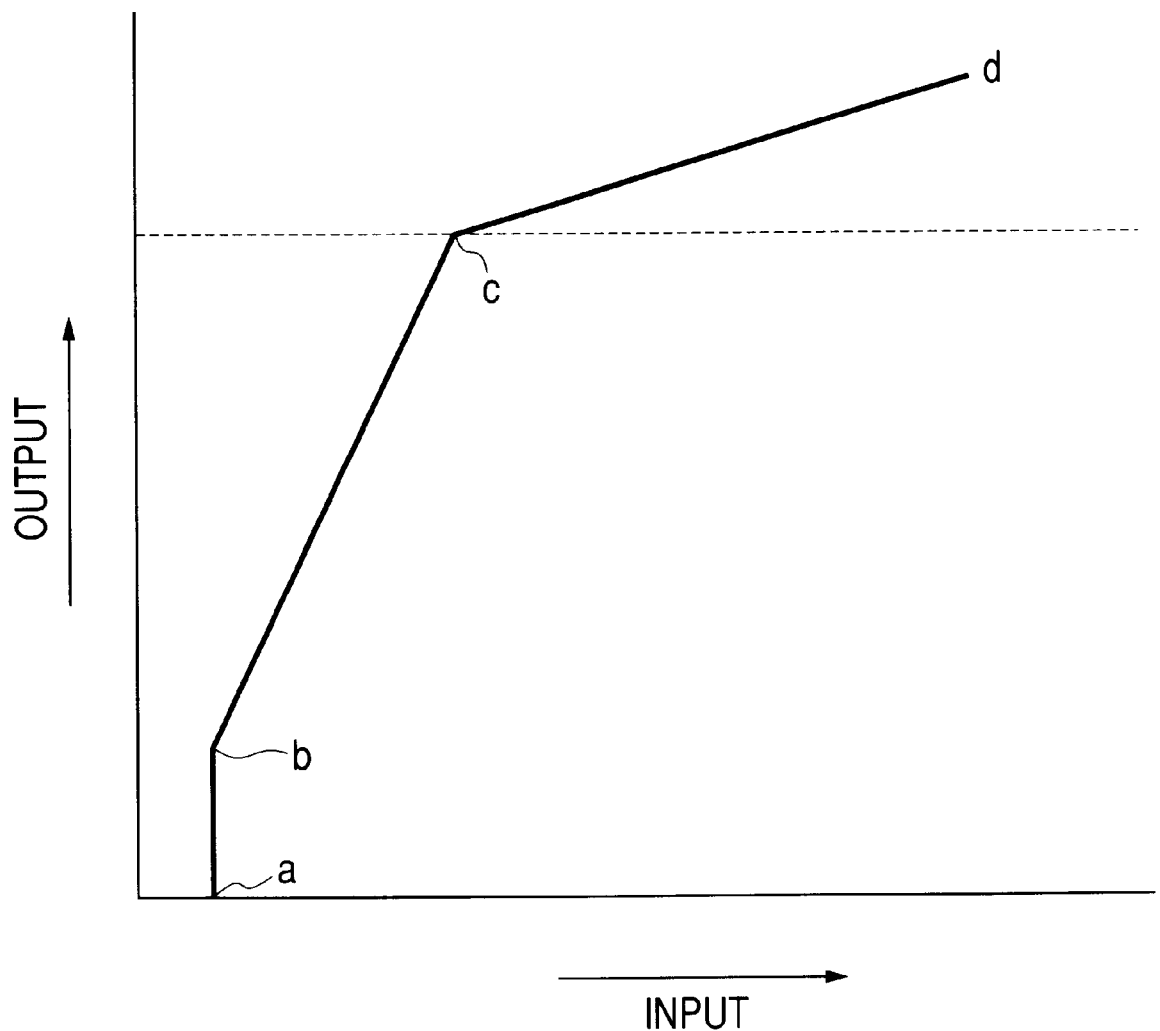
FIG. 5 is a graph showing the servo characteristic of the vacuum booster.
Figure 6:
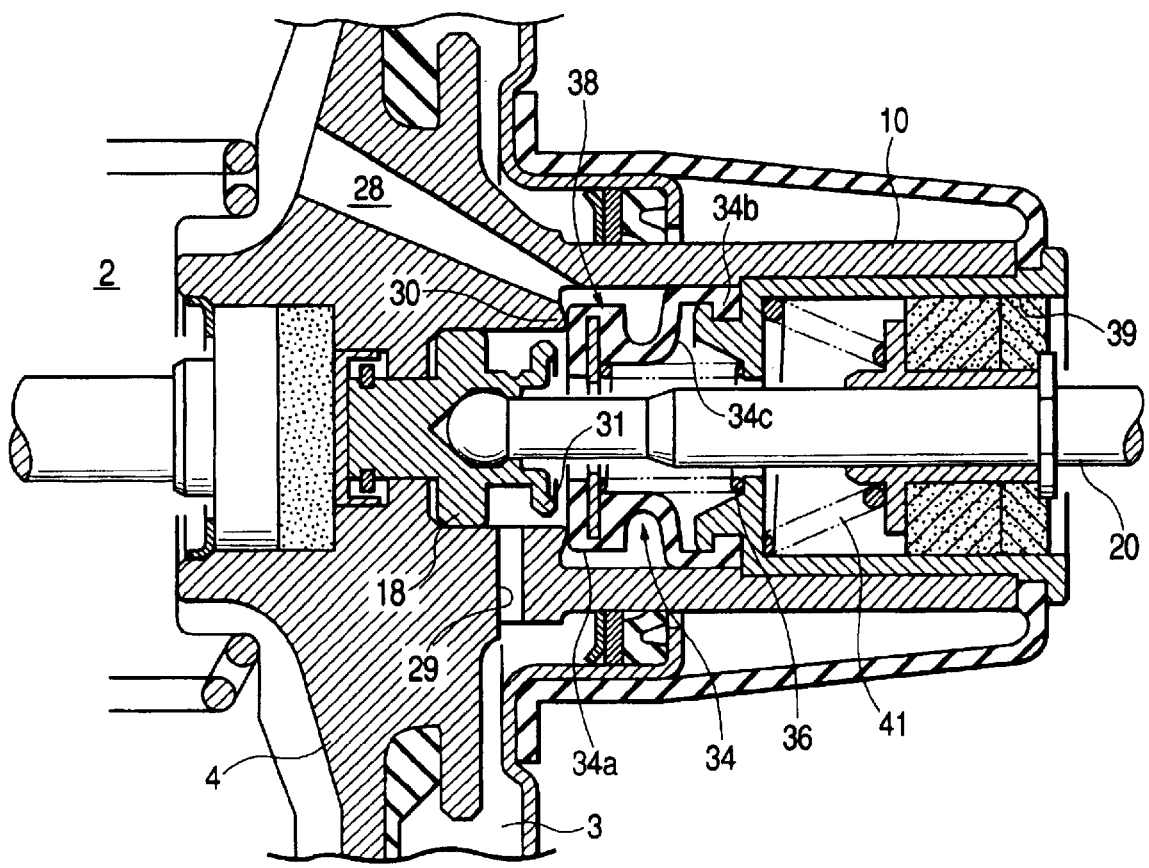
FIG. 6 is a cross-sectional view of a control valve element in a conventional vacuum booster.

When the brake pedal P is released in order to cancel the braking state of the vehicle, first, the input rod 20 and the valve piston 18 are retracted by the force exerted by the input return spring 41. Accordingly, as is shown in FIG. 4, the valve piston 18 seats the valve element 34 on the atmosphere introduction valve seat 31, while widely separating the valve element 34 from the vacuum introduction valve seat 30. Thus, the operating chamber 3 communicates with the vacuum chamber 2 via the second port 29 and the first port 28. As a result, the introduction into the operating chamber 3 of air from the atmosphere is prevented, and air from the operating chamber 3 is obtained, via the vacuum chamber 2, by the vacuum source V, thereby removing the existing pressure difference. Thus, the booster piston 4 is also retracted by the urging force applied by the booster return spring 27 to cancel the operation of the master cylinder M, and thereafter, the booster piston 4 and the input rod 20 are returned to the halted state shown in FIGS. 1 and 2.

This invention is not limited to this embodiment, and can be variously modified without departing from the scope of the invention. For example, the vacuum booster B can be provided as a tandem-type booster wherein a pair of front and rear booster pistons are coupled with the same valve cylinder.

As is described above, according to the first aspect of the invention, a vacuum booster is provided, wherein a booster piston is located in a booster shell to divide the interior of the booster shell into a front vacuum chamber and a rear operating chamber, both of which communicate with a vacuum source, wherein a valve piston fitted into a valve cylinder slides forward and backward, an input rod that connects the front end to the valve piston, a control valve that, in accordance with the forward and backward movement of the input rod between the valve piston and the valve cylinder, alters the configuration of the operating chamber to enable communication with either the vacuum chamber or with the atmosphere, and an input return spring that impels the input rod backward are arranged in the valve cylinder that communicates with the booster piston, wherein the control valve is constituted by a ring-shaped vacuum introduction valve seat formed for the valve cylinder, an atmosphere introduction valve seat formed for the valve piston and positioned inside the vacuum introduction valve seat, a valve element that includes: a ring-shaped attachment bead portion securely supported at the inner wall of the valve cylinder; an elastic cylinder axially extending from the attachment bead portion; and a valve portion connected, flange-like, to the front end of the elastic cylinder and located facing the vacuum introduction valve seat and the atmosphere introduction valve seat, on which the valve portion is to be seated thereon, wherein a first port that communicates with the vacuum chamber is opened to the outer wall side of the vacuum introduction valve seat, and a second port that communicates with the operating chamber is opened between the vacuum introduction valve seat and the atmosphere introduction valve seat, thus enabling the inside of the valve portion to communicate with the atmosphere, and wherein the valve portion is fitted inside the valve cylinder so as to slide in close proximity along the inner wall of the valve cylinder, wherein a front annular chamber, which is located at the front face of the valve portion and which is closed when the valve portion is seated on the vacuum introduction valve seat, and a rear annular chamber, toward which the rear of the valve portion faces, are formed in the valve cylinder, and wherein the front annular chamber communicates with the first port, and the rear annular chamber communicates with the second port. Therefore, when the input rod is moved forward, and when the atmosphere introduction valve seat is separated from the valve portion of the valve element while the valve disk is seated on the vacuum introduction valve seat, not only in accordance with the set load of the valve spring, but also in accordance with the pressure difference between the front and rear annular chambers, the valve portion is urged in the direction in which it will be seated on the vacuum introduction valve seat. Therefore, only a small load is required to set not only for the valve spring, but also for the input return spring that impels the input rod to the rear, so that the load imposed by the initial operation of the input rod can be reduced.

According to the second aspect of the invention, a sealing lip, which is formed around the outer wall of the valve portion, is bent to the rear so as slide in close proximity along the inner wall of the valve cylinder. Therefore, when the atmosphere introduction valve seat is separated from the valve portion of the valve element, and when the valve portion is seated on the vacuum introduction valve seat, the force with which the sealing lip is held closely against the inner wall of the valve cylinder is increased due to the pressure difference generated between the front and rear annular chambers, and between the front and rear annular chambers an airtight condition can be obtained.

According to the third aspect, a through hole, which connects the rear annular chamber and the first port, is formed in the valve cylinder parallel to the axial line. Therefore, at the same time as the valve cylinder is formed, the through hole can also be formed by a core cylindrical pin. Thus, a valve cylinder having a communication path can be provided at a low cost.

What is claimed is:

1. A vacuum booster, comprising:
   a booster shell;
   a booster piston accommodated in said booster shell to divide the interior of said booster shell into a front vacuum chamber communicating with a vacuum source and a rear operating chamber;
   a valve cylinder connected to said booster piston;
   a valve piston fitted into said valve cylinder so as to be slidable forward and backward;
   an input rod connected to said valve piston at a front end thereof;
   an input return spring urging said input rod backward; and
   a control valve arranged within said valve cylinder, for changing over the communication of said operating chamber with one of said vacuum chamber and the atmosphere in accordance with the forward and backward movement of said input rod, said control valve including:
      a ring-shaped vacuum introduction valve seat formed in said valve cylinder;
      an atmosphere introduction valve seat formed in said valve piston and disposed inside said vacuum introduction valve seat;
      a valve element having: a ring-shaped attachment bead portion securely held with respect to an inner wall of said valve cylinder; an elastic cylinder axially extending from said attachment bead portion; and, an annular valve portion connected in a flange shape to a front end of said elastic cylinder and facing said vacuum introduction valve seat and said atmosphere introduction valve seat, on which said valve portion is to be seated; and
      a valve spring urging said valve portion in a direction that said valve portion is seated on said vacuum introduction valve seat and said atmosphere introduction valve seat,
      wherein a first port that communicates with said vacuum chamber is opened to an outer periphery side of said vacuum introduction valve seat, a second port that communicates with said operating chamber is opened between said vacuum introduction valve seat and said atmosphere introduction valve seat, and an inner periphery side of said valve portion is communicated with the atmosphere,
      further wherein said valve portion is fitted with said valve cylinder so as to be slidably contacted with the inner wall of said valve cylinder, to define a front annular chamber and a rear annular chamber within said valve cylinder, said front annular chamber being closed by a front face of said valve portion when said valve portion is seated on said vacuum introduction valve seat, said rear annular chamber being formed so that the rear of said valve portion is faced thereto, and further wherein said front annular chamber communicates with said first port, and said rear annular chamber communicates with said second port to introduce atmosphere into said rear annular chamber to reduce operating forces during normal braking conditions.

2. The vacuum booster according to claim 1, wherein said valve portion includes a sealing lip in the outer periphery thereof, bent rearwardly so as to be slidably contacted with the inner wall of said valve cylinder.

3. The vacuum booster according to claim 1, wherein a through hole communicating with said rear annular chamber and the second port is formed in said valve cylinder parallel to an axial line of said valve cylinder.

4. The vacuum booster according to claim 1, further comprising:
   a valve holder for securely holding said attachment bead portion with respect to the inner wall of said valve cylinder, said valve holder being axially positioned by a stepped portion formed in the inner wall of said valve cylinder and said input return spring.

5. The vacuum booster according to claim 1, wherein said front annular chamber is partially defined by an outer surface of said vacuum introduction valve seat and the inner wall of said valve cylinder contacting an outer periphery of said valve portion.

6. The vacuum booster according to claim 1, wherein said vacuum introduction valve seat is positioned concentrically with the atmospheric introduction valve seat to enclose the atmospheric introduction valve seat.

7. The vacuum booster according to claim 1, wherein:
   a ring-shaped sealing lip is integrally formed with the outer wall of the valve portion, and
   when the atmosphere introduction valve seat is separated from the valve portion, and when the valve portion is seated on the vacuum introduction valve seat, a force with which the sealing lip is held against the inner wall of the valve cylinder is increased due to a pressure difference generated between the front and rear annular chambers such that between the front and rear annular chambers an airtight condition is obtained.

8. The vacuum booster according to claim 1, wherein the attachment bead portion is sandwiched between a pair of valve holders, which contact a rear end of a ring-shaped projection integrally formed in an inner wall of the valve cylinder together with the vacuum introduction valve seat.

9. The vacuum booster according to claim 1, wherein:
   the front annular chamber encloses the vacuum introduction valve seat formed in a ring-shaped projection on an inner wall of the valve cylinder; and
   the inner wall of the front annular chamber extends to the rear from the vacuum introduction valve seat such that a sealing lip of the valve portion contacts with and slides along the inner wall of the front annular chamber so as to close the front annular chamber when the valve portion is seated on the vacuum introduction valve seat.

10. The vacuum booster according to claim 1, further comprising:
   a forwardly projecting operating piston and a cylinder hole which passes through a center of the operating piston formed in the valve cylinder;
   a cup member slidably fitted over an outer wall of the operating piston;
   a flat flexible piston inserted into the cup member so that the flat flexible piston is positioned opposite to the operating piston and a reaction piston; and
   an output rod projecting from the front face of the cup member and connected to a piston of a brake master cylinder,
   wherein a gap is formed between the reaction piston and the flexible piston when the vacuum booster is not being operated, and
   wherein the reaction piston is slidably fitted into the cylinder hole.

11. The vacuum booster according to claim 1, wherein during a forward movement of the input rod, a vacuum pressure, which is transmitted from the first port to the front annular chamber, acts on a front face of the valve portion that faces the front annular chamber, while atmospheric pressure, which is transmitted from the second port to the rear annular chamber acts on the rear face of the valve portion that faces the rear annular chamber such that said valve portion is seated on the vacuum introduction valve seat by a set load of the valve spring and a difference in pressures built up in the front and rear annular chambers.

12. A vacuum booster, comprising:
   a booster shell;
   a booster piston accommodated in said booster shell to divide the interior of said booster shell into a front vacuum chamber communicating with a vacuum source and a rear operating chamber;
   a valve cylinder connected to said booster piston;
   a valve piston fitted into said valve cylinder so as to be slidable forward and backward;
   an input rod connected to said valve piston at a front end thereof;
   an input return spring urging said input rod backward; and
   a control valve arranged within said valve cylinder, including:
   a ring-shaped vacuum introduction valve seat formed in said valve cylinder;
   an atmosphere introduction valve seat formed in said valve piston and disposed inside said vacuum introduction valve seat;
   a common valve portion facing in a first direction towards said vacuum introduction valve seat and said atmosphere introduction valve seat, on which said common valve portion is to be seated;
   a valve spring urging said common valve portion in a direction that said common valve portion is seated on said vacuum introduction valve seat and said atmosphere introduction valve seat; and
   a sealing lip integrally formed with an outer wall of the said common valve portion,
   wherein a first port that communicates with said vacuum chamber is opened to an outer periphery side of said vacuum introduction valve seat, a second port that communicates with said operating chamber is opened between said vacuum introduction valve seat and said atmosphere introduction valve seat, and an inner periphery side of said common valve portion is communicated with the atmosphere,
   wherein when the atmosphere introduction valve seat is separated from the valve portion, and when the valve portion is seated on the vacuum introduction valve seat, a force with which the sealing lip is held against the inner wall of the valve cylinder is increased due to a pressure difference generated between the front and rear annular chambers such that between the front and rear annular chambers an airtight condition is obtained, wherein introduction of atmosphere into the rear annular chamber reduces operating forces during normal braking conditions.

13. The vacuum booster according to claim 12, wherein during a forward movement of the input rod, a vacuum pressure, which is transmitted from the first port to the front annular chamber, acts on a front face of the valve portion that faces the front annular chamber, while atmospheric pressure, which is transmitted from the second port to the rear annular chamber acts on the rear face of the valve portion that faces the rear annular chamber such that said valve portion is seated on the vacuum introduction valve seat by a set load of the valve spring and a difference in pressures built up in the front and rear annular chambers.

14. The vacuum booster according to claim 13, wherein a through hole communicating with said rear annular chamber and the second port is formed in said valve cylinder parallel to an axial line of said valve cylinder.

15. The vacuum booster according to claim 12, wherein said front annular chamber is partially defined by an outer surface of said vacuum introduction valve seat and the inner wall of said valve cylinder contacting an outer periphery of said common valve portion.

16. The vacuum booster according to claim 12, wherein said valve piston includes:
a neck portion,
a reaction piston formed at the front portion of the neck portion opposing the atmosphere introduction valve seat which is formed at a rear portion of the valve piston, and
said vacuum introduction valve seat is positioned concentrically with the atmospheric introduction valve seat to enclose the atmospheric introduction valve seat.

17. The vacuum booster according to claim 12, wherein the valve spring is shrinkingly disposed between a reinforcing plate of the valve portion and the input rod.

18. A vacuum booster, comprising:
a booster shell;
a booster piston accommodated in said booster shell to divide the interior of said booster shell into a front vacuum chamber communicating with a vacuum source and a rear operating chamber;
a valve cylinder connected to said booster piston;
a valve piston fitted into said valve cylinder so as to be slidable forward and backward;
an input rod connected to said valve piston at a front end thereof;
an input return spring urging said input rod backward; and
a control valve arranged within said valve cylinder for changing over the communication of said operating chamber with one of said vacuum chamber and the atmosphere in accordance with the forward and backward movement of said input rod, said control valve including:
a ring-shaped vacuum introduction valve seat formed in said valve cylinder;
an atmosphere introduction valve seat formed in said valve piston and disposed inside said vacuum introduction valve seat;
a valve element having a valve portion facing said vacuum introduction valve seat and said atmosphere introduction valve seat, on which said valve portion is to be seated; and
a valve spring sbrinkingly disposed between the valve portion and the input rod urging said valve portion in a direction that said valve portion is seated on said vacuum introduction valve seat and said atmosphere introduction valve seat.

19. The vacuum booster according to claim 18, wherein:
a first port that communicates with said vacuum chamber is opened to an outer periphery side of said vacuum introduction valve seat, a second port that communicates with said operating chamber is opened between said vacuum introduction valve seat and said atmosphere introduction valve seat, and an inner periphery side of said valve portion is communicated with the atmosphere,
wherein said valve portion is fitted with said valve cylinder so as to be slidably contacted with the inner wall of said valve cylinder, to define a front annular chamber and a rear annular chamber within said valve cylinder, said front annular chamber being closed by a front face of said valve portion when said valve portion is seated on said vacuum introduction valve seat, said rear annular chamber being formed so that the rear of said valve portion is faced thereto, and
wherein said front annular chamber communicates with said first port, and said rear annular chamber communicates with said second port.

20. (currently added) A vacuum booster, comprising:
a booster shell;
a booster piston accommodated in said booster shell to divide the interior of said booster shell into a front vacuum chamber communicating with a vacuum source and a rear operating chamber;
a valve cylinder connected to said booster piston;
a valve piston fitted into said valve cylinder so as to be slidable forward and backward;
an input rod connected to said valve piston at a front end thereof;
an input return spring urging said input rod backward; and
a control valve arranged within said valve cylinder, for changing over the communication of said operating chamber with one of said vacuum chamber and the atmosphere in accordance with the forward and backward movement of said input rod, said control valve including:
a ring-shaped vacuum introduction valve seat formed in said valve cylinder;
an atmosphere introduction valve seat formed in said valve piston and disposed inside said vacuum introduction valve seat;
a valve element having: a ring-shaped attachment bead portion securely held with respect to an inner wall of said valve cylinder; an elastic cylinder axially extending from said attachment bead portion; and, an annular valve portion connected in a flange shape to a front end of said elastic cylinder and facing said vacuum introduction valve seat and said atmosphere introduction valve seat, on which said valve portion is to be seated; and
a valve spring urging said valve portion in a direction that said valve portion is seated on said vacuum introduction valve seat and said atmosphere introduction valve seat,
wherein a first port that communicates with said vacuum chamber is opened to an outer periphery side of said vacuum introduction valve seat, a second port that communicates with said operating chamber is opened between said vacuum introduction valve seat and said atmosphere introduction valve seat, and an inner periphery side of said valve portion is communicated with the atmosphere, further wherein said valve portion is fitted with said valve cylinder so as to be slidably contacted with the inner wall of said valve cylinder, to define a front annular chamber and a rear annular chamber within said valve cylinder, said front annular chamber being closed by a front face of said valve portion when said valve portion is seated on said vacuum introduction valve seat, said rear annular chamber being formed so that the rear of said valve portion is faced thereto, and further wherein said front annular chamber communicates with said first port, and said rear annular chamber communicates with said second port to introduce atmosphere into said rear annular chamber to reduce initial operating force during braking conditions.

21. A vacuum booster, comprising:

a booster shell;

a booster piston accommodated in said booster shell to divide the interior of said booster shell into a front vacuum chamber communicating with a vacuum source and a rear operating chamber;

a valve cylinder connected to said booster piston;

a valve piston fitted into said valve cylinder so as to be slidable forward and backward;

an input rod connected to said valve piston at a front end thereof, an input return spring urging said input rod backward; and a control valve arranged within said valve cylinder, including:

a ring-shaped vacuum introduction valve seat formed in said valve cylinder;

an atmosphere introduction valve seat formed in said valve piston and disposed inside said vacuum introduction valve seat;

a common valve portion facing in a first direction towards said vacuum introduction valve seat and said atmosphere introduction valve seat, on which said common valve portion is to be seated;

a valve spring urging said common valve portion in a direction that said common valve portion is seated on said vacuum introduction valve seat and said atmosphere introduction valve seat; and a sealing lip integrally formed with an outer wall of the said common valve portion, wherein a first port that communicates with said vacuum chamber is opened to an outer periphery side of said vacuum introduction valve seat, a second port that communicates with said operating chamber is opened between said vacuum introduction valve seat and said atmosphere introduction valve seat, and an inner periphery side of said common valve portion is communicated with the atmosphere, wherein when the atmosphere introduction valve seat is separated from the valve portion, and when the valve portion is seated on the vacuum introduction valve seat, a force with which the sealing lip is held against the inner wall of the valve cylinder is increased due to a pressure difference generated between the front and rear annular chambers such that between the front and rear annular chambers an airtight condition is obtained, wherein introduction of atmosphere into the rear annular chamber reduces initial operating force during braking conditions.

* * * * *

UNITED STATES PATENT AND TRADEMARK OFFICE
CERTIFICATE OF CORRECTION

PATENT NO.      : 6,718,863 B2
DATED           : April 13, 2004
INVENTOR(S)     : Takayoshi Shinohara It is certified that error appears in the above-identified patent and that said Letters Patent is hereby corrected as shown below:

Column 13,
Line 66, delete "sbrinkingly" and insert -- shrinkingly --.

Signed and Sealed this

Twenty-fifth Day of May, 2004

JON W. DUDAS
*Acting Director of the United States Patent and Trademark Office*